US008352589B2

(12) United States Patent
Ridel et al.

(10) Patent No.: US 8,352,589 B2
(45) Date of Patent: *Jan. 8, 2013

(54) SYSTEM FOR MONITORING COMPUTER SYSTEMS AND ALERTING USERS OF FAULTS

(75) Inventors: Lenny Ridel, Hod Hasharon (IL); Shlomo Lahav, Ramat Gan (IL); Miki Rubinshtein, Tel Aviv (IL); Boris Freydin, Rehovot (IL); Eden Shochat, Herzelia (IL); Orit Kislev Kapon, Kiryat-Ono (IL)

(73) Assignee: Aternity Information Systems Ltd., Hod Hasharon (IL)

( * ) Notice: Subject to any disclaimer, the term of this patent is extended or adjusted under 35 U.S.C. 154(b) by 537 days.

This patent is subject to a terminal disclaimer.

(21) Appl. No.: 11/316,452

(22) Filed: Dec. 22, 2005

(65) Prior Publication Data

US 2007/0130330 A1    Jun. 7, 2007

Related U.S. Application Data

(60) Provisional application No. 60/737,036, filed on Nov. 15, 2005.

(51) Int. Cl.
G06F 15/16 (2006.01)
G06F 7/00 (2006.01)
(52) U.S. Cl. ................... 709/224; 709/227; 707/600
(58) Field of Classification Search ................... 709/224; 707/206; 726/25
See application file for complete search history.

(56) References Cited

U.S. PATENT DOCUMENTS

| | | | | |
|---|---|---|---|---|
| 6,321,338 | B1 * | 11/2001 | Porras et al. | 726/25 |
| 6,336,139 | B1 * | 1/2002 | Feridun et al. | 709/224 |
| 6,466,932 | B1 | 10/2002 | Dennis et al. | |
| 6,643,614 | B2 * | 11/2003 | Ding et al. | 702/186 |
| 6,704,803 | B2 * | 3/2004 | Wilson et al. | 719/315 |
| 6,742,128 | B1 * | 5/2004 | Joiner | 726/25 |
| 6,801,940 | B1 * | 10/2004 | Moran et al. | 709/224 |
| 6,963,983 | B2 * | 11/2005 | Munson et al. | 726/5 |
| 7,131,037 | B1 * | 10/2006 | LeFaive et al. | 714/46 |
| 7,290,048 | B1 * | 10/2007 | Barnett et al. | 709/223 |
| 7,490,073 | B1 * | 2/2009 | Qureshi et al. | 706/50 |
| 2003/0084329 | A1 * | 5/2003 | Tarquini | 713/200 |
| 2004/0010718 | A1 * | 1/2004 | Porras et al. | 713/201 |
| 2004/0034795 | A1 * | 2/2004 | Anderson et al. | 713/201 |

(Continued)

OTHER PUBLICATIONS

Open e-Security Platform as in "Partner Sales Guide" Rockledge Fl. from Winter 2002.

*Primary Examiner* — Ranodhi Serrao
*Assistant Examiner* — Muktesh G Gupta
(74) *Attorney, Agent, or Firm* — The Law Office of Michael E. Kondoudis (57) ABSTRACT

A System is monitored by detecting activity signatures of network components. Some of the activity signatures are generated by sensing patterns of operations in data streams. Some of the activity signatures are precompiled in the system, or are standard in computer systems. The activity signatures are stored in a database. Select information about select baselined attributes generates monitoring profiles (MPs) for the baselined attributes. The MPs are defined so abnormal behavior of end points and/or system components can be detected. The system compiles baseline values for baselined attributes of MP's. By properly analyzing deviating end points or components one can determine what is causing a problem or who is effected by a problem based on which identifying attributes are common to the deviating end points or components.

12 Claims, 6 Drawing Sheets

U.S. PATENT DOCUMENTS

2004/0049473 A1* 3/2004 Gower et al. .................. 706/46
2004/0049566 A1  3/2004 Mattila et al.
2004/0093513 A1* 5/2004 Cantrell et al. ............... 713/201
2005/0038818 A1* 2/2005 Hooks ........................ 707/104.1
2005/0044406 A1* 2/2005 Stute ............................ 713/201
2006/0026675 A1* 2/2006 Cai et al. ........................ 726/22
2006/0092861 A1* 5/2006 Corday et al. ................ 370/256

* cited by examiner

SYSTEM FOR MONITORING COMPUTER SYSTEMS AND ALERTING USERS OF FAULTS

REFERENCE TO PROVISIONAL APPLICATION

This application is based on and claims the benefit of the filing date of provisional application Ser. No. 60/737,036 filed on Nov. 15, 2005 and entitled System for Inventing Computer Systems and Alerting Users of Faults.

FIELD OF THE INVENTION

This invention relates to the field of monitoring and alerting users of monitored faults and/or correcting monitored faults of computer systems and particularly to the monitoring and alerting users of monitored faults and/or correcting monitored faults of distributed computer systems.

BACKGROUND OF THE INVENTION

Figure 1:
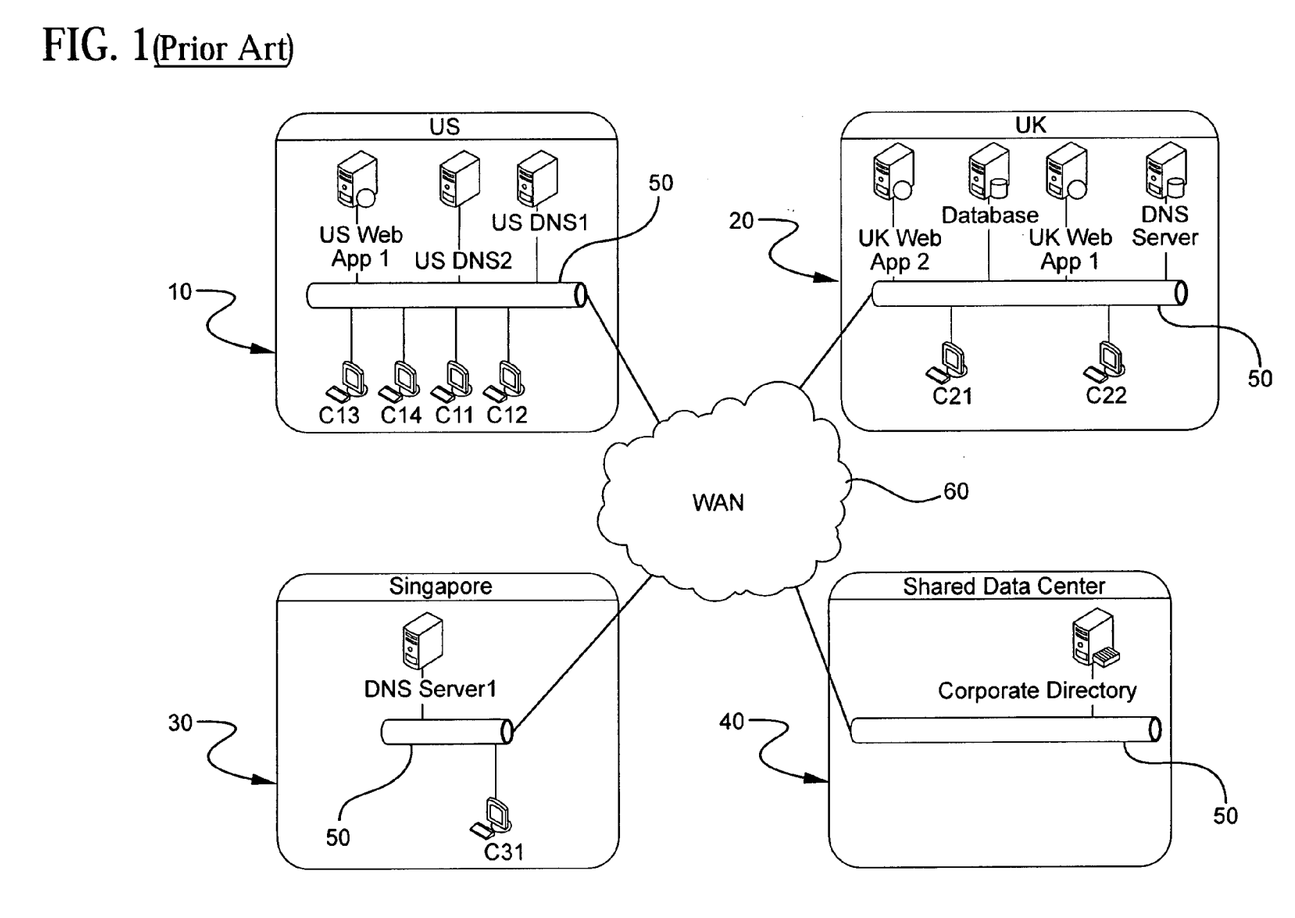
FIG. 1 is a system diagram of a multi office system of the prior art to the system of this invention.

Computer systems exist, see FIG. 1, which include a plurality LANs 50 located at diverse geographic locations, such as 10, 20, 30 and 40, interconnected by a WAN 60 such as the internet. The system may also include one or more servers, databases and/or message queues and/or other network components associated with the WAN 60 or one of the LANs 50. A plurality of terminals or end points, such as C11 to C14 at location 10, C21 and C22 at location 20 and C31 at location 30, can be connected to one or more of the LANs 50 or directly to the WAN 60. Each end point can be a PC and may have a plurality of attributes and run a plurality of programs or applications. Each PC often interacts over the WAN 60 or LAN 50 with network components or other PCs. An application often performs more than one activity. For example, the program Outlook can send and receive e-mails, add or remove an appointment from a calendar and other activities. In turn each activity is usually constructed from a plurality of operations such as key strokes and mouse clicks, each of which generates one or more opcodes representing operations.

Figure 2:
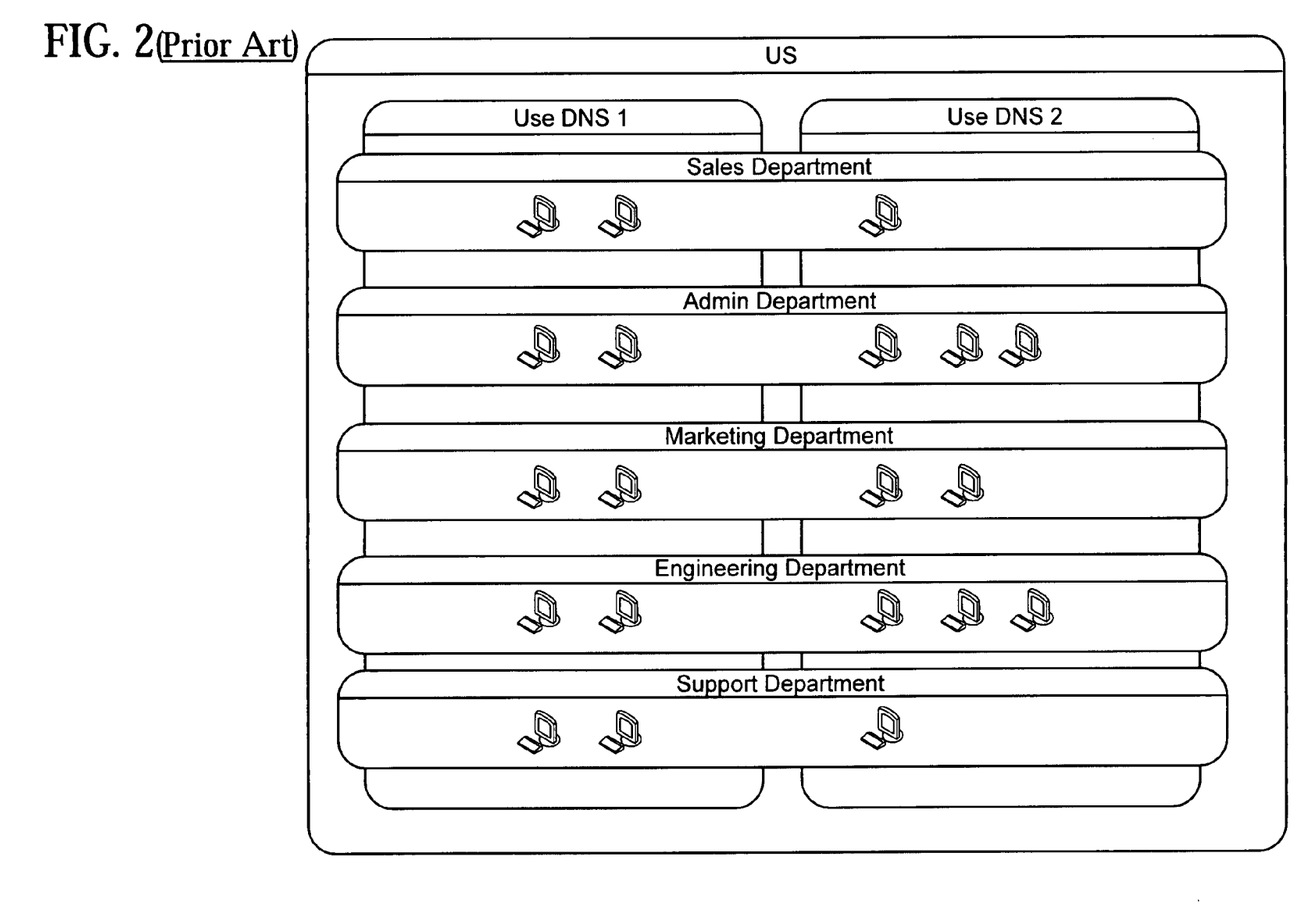
FIG. 2 is a system diagram of a single office on the multi office system of FIG. 1.

Computer systems and components thereof have many attributes. Some of the attributes are identifying attributes (eg. identification of logged-in user, LAN subnet where it resides, timestamp of an activity, keyboard and mouse interactions, operating system on a server or PC or the PC or component itself.) Some of the attributes are baselined attributes (eg. latency of an activity of the system.) FIG. 2 shows, in schematic form, PCs at a single location grouped according to certain identifying attributes. For example, all of the PCs in the left box operate off of DNS server DNS-1 while all of the PCs in the right hand box operate off of DNS server DNS-2. The PCs are also identified according to department of the logged in user such as sales or engineering. PCs also have backend identifying attributes such as the Database that particular PC's operation relies on.

Presently monitoring systems exist which monitor network components and applications running thereon either by using scripts to emulate a user or by having an agent associated with the network component that can be queried either periodically or as needed to see if the network component or application is functioning properly. These systems are usually at a shared data center, see FIG. 1. at a location such as 40 and are preprogrammed Of course the shared data center can be at any location, even locations 10, 20 or 30.

BRIEF DESCRIPTION OF THE INVENTION

In a first embodiment of the system and method of this invention, a distributed computer system is monitored by detecting activity signatures of individually identifiable network components, programs and/or PCs by sensing operations (keystrokes on a keyboard or mouse clicks) and/or codes embedded in data streams in the system. To initialize the system the activity signatures are generated for identifying the various activities of the system. Some of the activity signatures are generated while the system operates by sensing patterns of operations in the data streams. Some of the activity signatures are precompiled in the system, such as those relating to the basic system components that make up the system configuration (eg. Lotus Notes and/or Outlook's MAPI over MSRPC) or are standard in computer systems such as commonly used protocols (eg. DNS, DHCP). Other activity signatures can be defined by a user of the system, such as the start/finish indications for a given activity. Still other activity signatures are generated from the data streams themselves..

Figure 3:
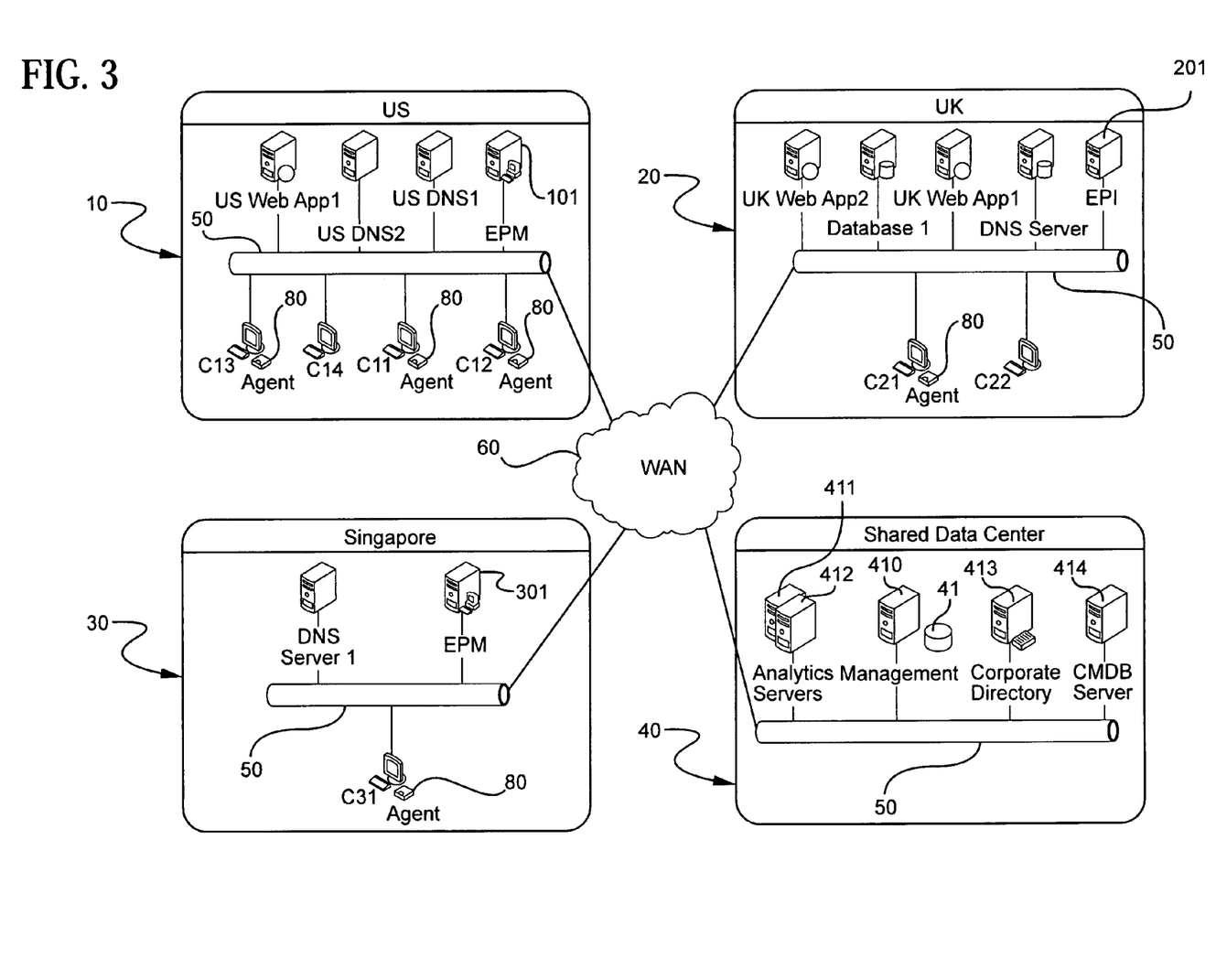
FIG. 3 is a system diagram of a multi office system of the system of this invention.

After the activity signatures are generated they are stored in a database 41, see FIG. 3, and used to further initialize the system for monitoring purposes. The system is run and select information about select baselined attributes of activities detected by their activity signatures are measured and compiled in the database 41. The signatures for measuring can relate to the activity signature for detection but may be longer or a shorter subset. As the information is being measured and compiled the system also generates monitoring profiles (MPs) for the baselined attributes of activities. The MPs are defined by a specific group of identifying attribute values of end points and/or system components so abnormal behavior of one or more end points and/or system components can later be detected. The identifying attribute values are also stored in the database 41 in relation to each end point and system component. Thus, each selected MP includes a combination of identifying attribute values (e.g.: time-of-day, subnet location and/or operating system) that can be used when examining end-points to decide whether the end point is part of that MP or not. Certain identifying attributes, such as departments can be imported from central organizational repositories like Directory servers see FIG. 3, 413, and assigned to specific end-point through other identifying attributes (e.g.: id of logged in user).

The system compiles baseline or critical values for select baselined attributes of MP's of the system in the database 41. Other baselines can be manually entered into the system such as when a monitoring organization agrees to help the system's users maintain at least a predetermined value for one or more combinations of attributes or MPs. In operation, the system monitors select MPs of the system, such as latency for sending an e-mail by users of Outlook for particular end points or components, against it's baseline.

By properly analyzing deviating end points or components of the system one can determine what is causing a problem or who is effected by a problem based on which identifying attributes are common to the deviating end points or components. The first step in either determination is to form groups of deviating end points and/or components. If there is a problem the system can either alert a user or the user's help organization or in some systems manually or automatically initiate corrective action.

In a preferred embodiment of the system agents 80 are installed in some or all of the end points and/or components of the system for sensing and collecting that end points and/or components operations, see FIG. 3. Pluralities of agents 80 communicate with End Point Managers 101, 201 and 301 (hereinafter "EPM's") over their associated LAN 50. The EPM's communicate with a Management Server 410 which in turn works with one or more Analytic Servers 411 and 412.

DESCRIPTION OF THE DRAWINGS

The details of this invention will now be explained with reference to the following specification and drawings in which.

DETAILED DESCRIPTION OF THE INVENTION

The aspects, features and advantages of the present invention will become better understood with regard to the following description with reference to the accompanying drawing(s). What follows are preferred embodiments of the present invention. It should be apparent to those skilled in the art that these embodiments are illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto.

Description of the Deployed System

Referring now to FIG. 3 we see that the system of this invention includes four types of software modules not present in the prior art system of FIG. 1. These modules are 1) The Agents 80, charged with information collection, 2) the End-Point Managers (EPMs) 101, 201 and 301, charged with aggregation of information from a plurality of Agents 80 on a specific LAN 50, 3) the Management server 410, which includes a database 41, charged with managing the database 41, exposing a graphical user interface to an operator and workload coordination, and 4) Analytics servers 411 and 412, that generate the MPs, perform the base lining, deviation detection and classification. As new analytic servers are added, the Management server 410 automatically distributes work to these servers.

All Agents 80 installed on the end-points and/or components in their respective location communicate with the local End-Point Manager (EPM) 101, 102 or 301 over their respective LAN 50. EPMs 101, 201 and 301 communicate with the main system over the slower and more expensive WAN 60 and can be used to reduce the amount of communication traffic using different data aggregation and compression methods, for example by performing data aggregation into histograms [alternatively, the histogram generation can also done on the analytic servers]. Histograms serve as a condensed data form that describes the commonality of a certain metric over time. Histograms are used by the system in generating normal behavior baselines as well as performing deviation detection.

Each protocol running on the system has its own means for identifying the applications that are using that protocol. Each supported protocol (transactional protocols like HTTP, streaming protocols like Citrix, request-response protocols like Outlook's MailAPI, others) enumerates a list of applications detected by the Agents 80 to the system console on the Management server 410. This is stored in a persistent manner, allowing for the configuration of Agents 80 later on in the process, and after a system re-start.

The Agents 80 monitor (measure and/or collect) the attribute values for end points, and components. For Outlook (the application) the Agent 80 monitors the latency of (1) sending e-mail (an activity) and (2) receiving e-mail (an activity). The latency and other attributes of each of the activities are the baselined attributes. Monitored attributes can include both identifiable attributes and baselined attributes such as: OS parameters, such as version, processes running; system parameters such as installed RAM and available RAM; application parameters such as response time for activities of applications The Agent 80 can send to the EPMs: 101, 201 and/or 301 1) any measurement it makes (high communication overhead, low latency, 2) queue measurements and send at pre-determined intervals, potentially aggregating a few values together for transmission (low communication overhead, medium latency), or the combination: 3) send any measurement that exceeds a pre-configured threshold immediately, but queue other measurements for later sending (low overhead, low latency)

The EPMs 101, 201 and 301 can aggregate such measurements into histograms. The EPMs 101, 201 and 301 generated histograms of monitored activity attributes in discovered applications are sent through a message subscription system (message queue) to several subscribing components in the system: 1) monitoring profile generation and 2) deviation detection, both on the Analytics servers 411 and 412.

As seen in FIG. 3, the system could include a Directory server 413 to collect organizational grouping data such as shown in FIG. 2. Such integration allows later correlation of common deviating end points or components with organizational criteria, enabling output such as: "80% of the suffering population is in New York, and affects 20% of the Sales Department".

Additional integration can be with a Configuration Management Database (CMDB) server 414, or other data sources where data about data center configuration items (CIs) and the relationships between them is available, to gather inter and intra application dependencies. Such integration allows for the generation of groups that are affected by back-end components. In a case where two applications both use a shared database, having the CMDB information can allow for later output such as: "The affected users represent the user population of two applications that both depend on a shared database server".

As we see information collection is done through the Agents 80 installed on the end-points, but for certain limited systems could potentially be done through network sniffing, through the capture of network packets at the network level rather than the operation level as done with Agents 80.

The agent-based approach is a better implementation option because it allows augmenting the network usage data, such as the packets generated by an Outlook send request with system user interaction collection, such as the fact that the user clicked the mouse, or pressed enter on the keyboard. This is because many times knowing the user interacted with the user interface can indicate the start or end of the user activity. The agent exposes this data as additional identifying attributes. An agent-based approach is also more scalable and software is easier to distribute than hardware sniffers, as it can be downloadable through the network.

An Agent approach also allows for far easier future support for the manipulation of operations. If a certain group of users does not adhere to baseline while a Service Level Agreement (SLA) the organization has requires it to conform to such baseline, an Agent-based approach could delay the sending of operations by another group in order to be able to satisfy the SLA. A network-based solution would have to queue the packets, requiring significant amounts of memory for an installation and also introducing unwarranted latency for queue processing.

System elements can communicate with each other through message oriented middleware (MOM) over any underlying communications channel. For example, through a publish/subscribe system, with underlying implementation through asynchronous queues. MOM together with component based system design, allows for a highly scalable and redundant system with transparent co-locating of any service on any server, capable of monitoring thousands of end points.

Activity Signature Generation

The system of this invention monitors a series of operations in applications and combines these into activities. An activity's signature is a unique series of operations that signify that activity. Activities can be included in other activities. To accomplish this, the included activity would also be considered an operation (so it's included in the other activity). Activity signatures can also include identifying attributes to be able have a signature for a specific group of end points.

Figure 4:
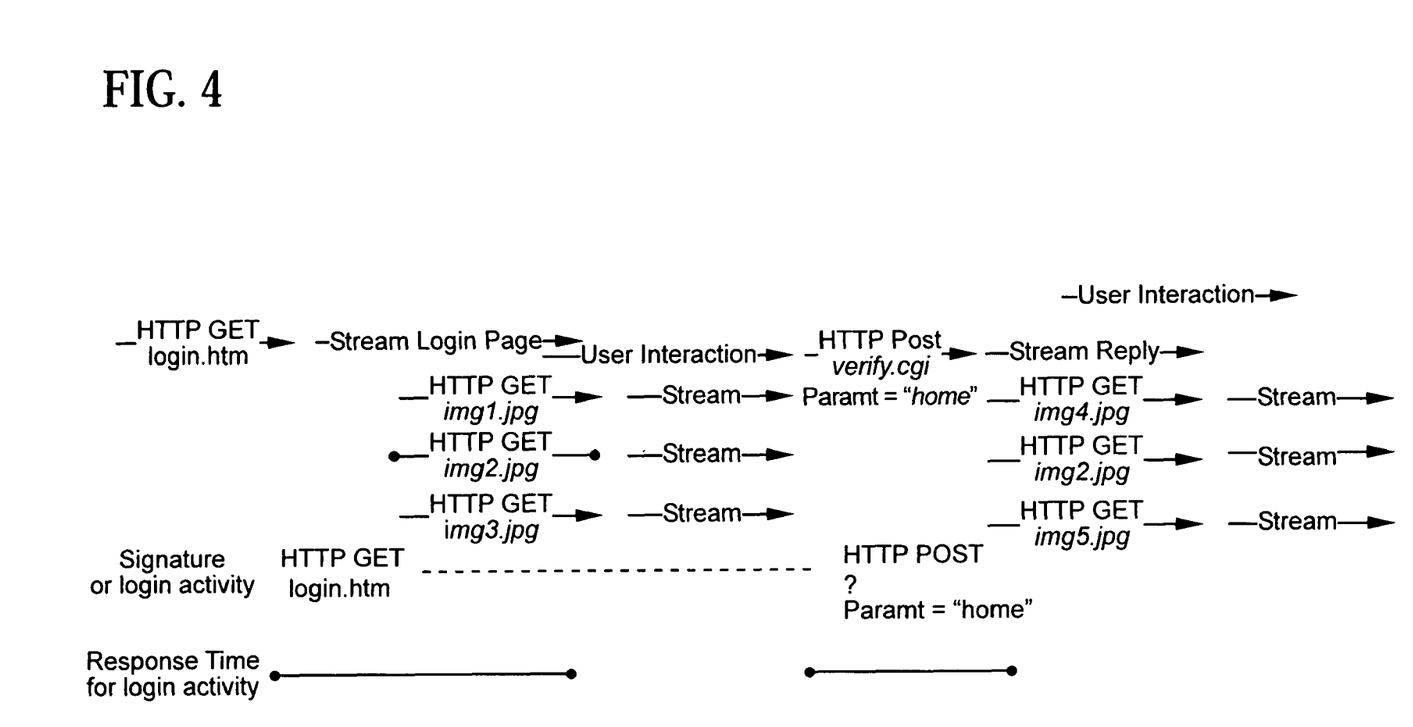
FIG. 4 is a chart showing how operations are combined into activities and how attributes of the activity are measured.

For example of an activity signature, as seen in FIG. 4, a single login activity (as perceived by the user) in an HTTP-based application can be combined from a number of different operations. The login activity starts by executing a GET operation for the login.html file from the server. The browser then executes a GET operation for a series of embedded image files [possibly different every time]. While the requests are still fulfilling, the user is able to interact with the browser content. Once the user presses the submit button, the browser uses the POST operation with the first parameter set to the value "home". The activity signature for the login activity would be an HTTP GET to the login page, followed by any number of additional GET operations and finalized by an HTTP POST with the first parameter set to "home". Thus it is seen, in this instance, that the activity signature is defined by a starting operation and an ending operation with a number of operations in the middle that do not form a part of the signature.

Activity signatures can be generated and entered into the system in a number of different ways. Some of the activity signatures come preconfigured with the system. Examples of these are Outlook's MAPI over MSRPC and Note's Notes-RPC.

Some of the signatures can be specified by the user, manually or through a recording mechanism that allows the user to perform the activity and have the system extract the operations from the recording which can then be used to form an activity signature.

Additional signatures can be generated by performing analysis of protocol traffic. This can be done through protocol analysis to generate an abstract (not protocol specific) sequence list of operation verbs. Next is the creation of activity signatures using statistical modeling techniques. For example, defining a dictionary of commonly used verb sequences and using this as the basis for a list of activities signatures definition. This is the preferred implementation, as it provides the greatest out-of-the-box value. The dictionary of commonly used verb sequences can be implemented through:

1. Collecting all opcodes performed by a subset of the end-points in the organization.
2. Grouping of opcodes that are executed in the same sequence. Grouping of similar sequences can be done through the use of clustering techniques (using timestamp deltas as the clustering criteria) or through the use of longest-sequence technique similar to LZ78, with wildcard support in order to allow for noise opcodes.
3. The above can be done first on a per end-point level to be able to reduce the complexity and then performing an additional step for uniting the result sets.

The analysis of protocol traffic to generate activity signatures can augment the user-specified recording mechanism as a way to support more complex protocols that have characteristics which are hard to record, such as loops (opcodes can be executed an arbitrary number of times in each communication) and noise opcodes (opcodes that can change between invocations of the same activity).

Activity Signature Detection

After the activity signatures are generated they are used to further initialize the system and for monitoring purposes. The system is run and select information about select baselined attributes of activities are measured and compiled in the database 41. The signatures for measuring can relate to the activity's signature but may be longer or a shorter subset. Alternatively, different signatures altogether can be used for the detection of an activity and measuring of it.

Monitored operations are matched against the activity detection signatures, and once an appropriate one is found, the corresponding activity measurement signature is used to determine the value for the activity baselined attribute.

By not operating at the operation level but the activity level, the system is able to generate information about complete activities.

For example, response time of the login activity, see FIG. 4, is measured by the time it takes from initiating the request to login.htm until finishing the download of it, and from POSTing the verify.cgi request until the first byte of reply streams in. The time the user fills in the form is not included. This provides an indication for the system time frame for the login.

Alternatively, even though the signature did not include the embedded image file, these could be measured as part of the total response time.

Signatures can also include identifying attributes to provide activity signatures for specific groups of end points such as time of day or department of the end user executing the operation.

Grouping End Points into Monitoring Profiles

The goal of generating monitoring profiles (MPs) is to have similarly identifiable groups of end points or components so we can detect abnormal behavior of a member or members of the group at a later time.

Each monitoring profile (MP) is defined by a combination of identifying attribute values that can be used when choosing end-points or components.

Each MP is used for evaluating a specific baselined attribute for deviation, so even though a single end-point usually belongs in a single monitoring profile for each baselined attribute at a given point in time, the same end-point can belong in multiple MPs for different baselined attributes.

Consider a system including a PC which performs an activity by accessing a Web Server which in turn accesses a database to return a response back to the PC through the Web Server. Further consider a plurality of PCs located in three different locations (the US, the UK and Singapore). In this system the Singapore PCs must use the US Web Server because there is none in Singapore and the Singapore and US PCs must use the UK database because there is none in either the US or Singapore.

In this situation the US users, accessing the local US Web App 1 server have slower performance than the UK users accessing the local UK Web App 1 server because the US server communicates with the UK-based Database. Singapore users have even lesser performance as they are accessing the US-based web server. (and the US server communicates with the UK-based Database.)

On average, each of the users in US, UK and Singapore has similar performance to other users in the same country. Thus three different MPs can be used for similar activities being performed in different countries.

There could still be differences between PCs in one or more of these MPs, for example because of different computer operating systems used by users, with some types offering better performance than others. In this case, sub-grouping (users in US with OS1, users in US with OS2, users in UK with OS1, and so forth)

The similarity allows the system to detect performance and availability deviations with low false positive and false negative rates, meaning with low rate of discovery of non-issues as issues and low rate of failing to discover issues.

In a specific implementation, the system represents the attribute values as dichotomous variables ("is subnet=10.1.2.3", "is hour_in_day=5,6,7") and performs model learning technique, for example decision tree, logistic regression or other clustering algorithms to detect which of the variables has the strongest influence on generation of a group viable for deviation detection. The preferred implementation uses the decision tree algorithm approach.

The output of the process is a list of attributes and values that when used to generate list of conforming end-points generates a list that is suitable for detection of deviation.

In a specific implementation, the system could consult with the user for attribute and specific attribute values that could represent a good predictor for homogenous behavior, and thus could be used by the system to define MPs. Such a user-driven predictor can be (in FIG. 3) Singapore, US and UK values of the Location attribute. The system could use these attribute/attribute values as priority predictor groups.

When the system finishes generating the MPs, the user could use the information to learn about his infrastructure behavior, and/or modify the MPs, providing their intimate knowledge of their infrastructure.

Figure 5A:
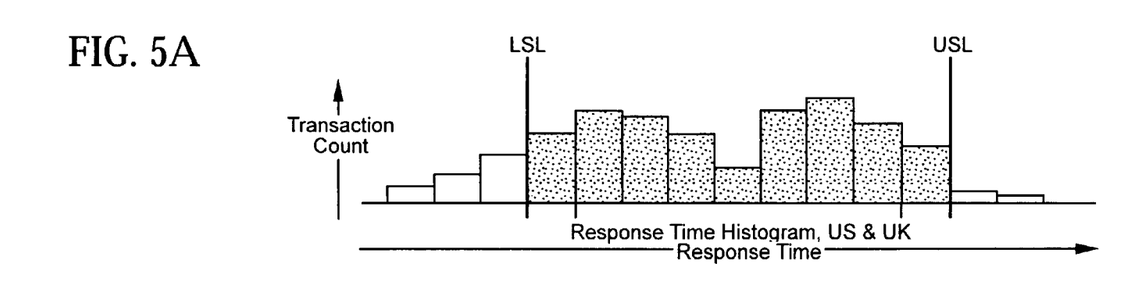
FIG. 5 shows a series of histograms which are used in defining MPs for a system of this invention.
Figure 5B:
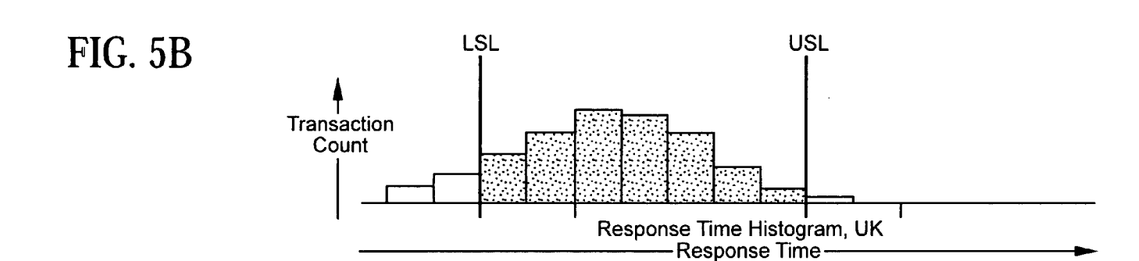
Figure 5C:
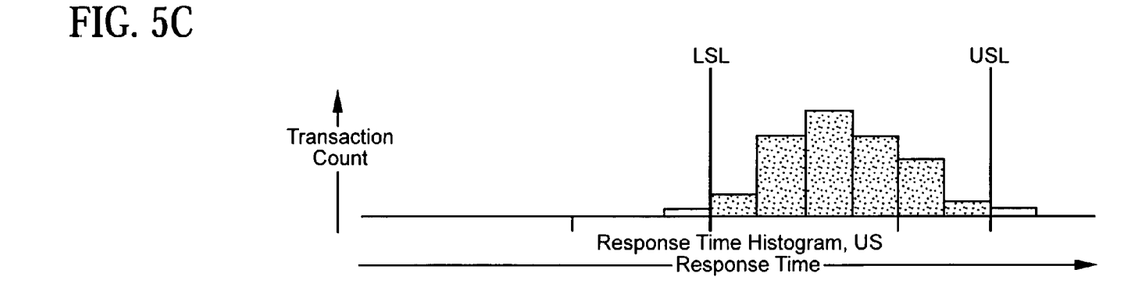

In FIG. 5a we see a histogram of an MP that has a baselined attribute with particular time values. In FIGS. 5b and 5c we see that either the system or an operator has split the MP into two MPs based on the two distinct peaks in FIG. 5a that represent two different identifiable attribute values such as different locations.

Another example of splitting MP can be when a cyclic event that slows down performance happens every Monday morning, and so initially when the MPs were generated, the event only happened once and didn't cause an MP to be generated. When this happens again, on the next Monday, the system or operator, could modify the MP and generate another MP, that each now includes (day_in_week="Monday", hour_in_day="7,8,9") and so represents a stronger potential detection ability.

If the user has specific obligations, such as Service Level Agreements (SLAs), the user could require a specific constraint according to the specific attribute value. Such SLAs could be: users in the UK location should have different performance obligation (99% of requests must finish within 2 seconds) than the US (99.9% of requests must finish within 1 second). Other possibility could be through another attribute, such as departmental grouping: users within Sales should have some form of a faster response than Administration.

Baseline Generation

During the generation of the monitoring profile (MP) and depending on the sensitivity settings and types of problems a user may wish to detect, the system generates critical or baseline values used by the detection system for each MP. Alternatively, the generation of critical values can be performed during system operation, depending on the current performance characteristics of the monitoring profile population and the sensitivity settings and types of problems user wish to detect.

In one implementation there could be a single maximum critical value threshold, while in another there could be multiple (e.g.: a minimum and maximum critical value, different critical values depending on number of deviating measurements, different critical values for different sensitivity settings). The advantage of this form of generating critical values instead of ranges of baselined attribute values is that we can take sensitivity into consideration, allowing the evaluation of both deviation magnitude (how big is the change) and deviation size (how many deviate).

The critical values are used to configure the histogram binning, meaning the range values used for generating range counts (e.g.: 0 ms-100 ms: 110, 100 ms-200 ms: 50, etc) for the histograms.

If the user has an SLA in place, he can set specific critical values to monitor and detect deviation from the SLA. The user can also provide guidance to the system to alert before such SLA is breached, allowing earlier remediation. The generated baselines can be used for deviation detection, as described below, as well as capacity planning of server capacity requirement vs. response time. We can use deviation points as indicators for less-than-required capacity.

Deviation Detection

In operation the previously generated baselines are used to compare expected behavior with current one. In a specific implementation, hypothesis testing methods are used. In further specific implementations, the hypothesis testing methods would be chi-squared or z-test.

Using previously generated critical values for a given MP, the system generates histograms of end-point measurements for select baselined attributes. The system then may turn the histogram into a set of counts for each of the ranges configured by these baseline critical values. These counts are then translated to a current value representing the current MP behavior through the hypothesis testing method. If the baseline critical value is reached, there has been a deviation from the MP. If multiple critical values are evaluated, deviation detection will be performed for each of those critical values.

If the critical value is dependant on the number of measurements for a given period or depending on sensitivity and type of problems to detect, the system could configure multiple such range values for the generation of the bins.

Figure 6:
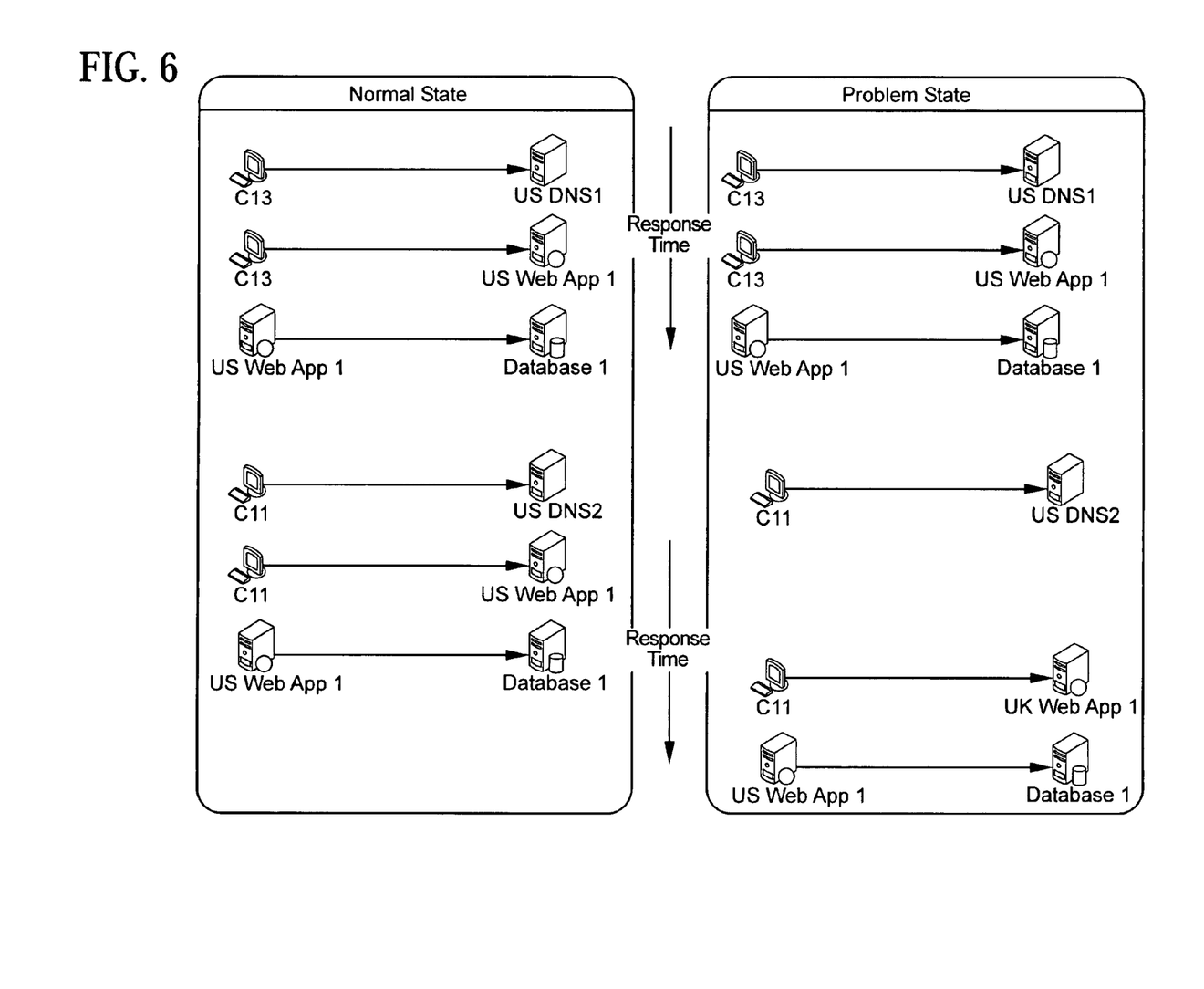
FIG. 6 shows an activity diagram of certain activities.

Referring now to FIG. 6, we see a flow diagram on the left side for the system of FIG. 3 properly operating for two separate activities and a flow diagram on the right side for the system of FIG. 3 properly operating for a first activity and not properly operating for a second activity. In the flow chart on the left side we see for the top flow that the PC C13 accesses US DNS 1 and returns a routing to the PC C13. The PC C13 then accesses US Web APP 1 which in turn access Database 1. As we can see from looking at the top flow for the right side the same flow is designated and there is no delay in operation on either side. When comparing the second flow on the two sides we see that the flow on the left side is normal but there is a gap, indicating a time delay, one the right side. By inspection we can tell that on the right side US DNS 2 returned the wrong information to the PC C11 and routed a message to UK Web App 1 instead of US Web App 1 causing a substantial delay. This time delay causes the activity represented by the second flow on the right to fall outside its MP and be detected.

In operation, the system monitors select baseline attributes of activities of end points or components, such as latency for sending an e-mail by users of Outlook in a particular location, against it's baseline and can either alert a user or the user's help organization if the baseline is not met at the then-current sensitivity settings or in some systems manually or automatically initiate corrective action. The system can also store detection statistics for the then-current and otherwise sensitivity settings.

Classification of Deviating End Points and/or Components

A symptom is defined as a deviation of a critical number of end-points or components within a single MP. A problem is defined as a combination of related symptoms. The combining of symptoms in this manner is called problem classification.

By properly analyzing deviating end points or components of the system one can determine what is causing a problem or who is effected by a problem based on which identifying attributes are common to the deviating end points or components The first step in either determination is to form groups of deviating end points and/or components into symptoms.

Certain symptoms that are compared against can provide context as to what's the reason for a problem.

Such problem can be identified by correlating the common identifying attributes of the end points in the symptoms making up the problem During the correlation process, the Analytics server process compares a group of affected end-points (comprising a symptom) to multiple groups of end-points that have specific identifying attribute values. The comparison process yields two numbers: positive correlation (How many of those in group A are members of group B) and negative correlation (How many of those in group B are NOT in group A) The importance of having both numbers is that B could be U (the "all" group) and so any group A would have very good positive correlation. The negative correlation in this case would be high, as many of those in group B aren't in group A. Searching for correlation results that combine multiple values can be computationally expensive and so a potential optimization is searching for a correlation that has a strong positive correlation metric, and adding additional criteria in order to reduce the negative correlation metric.

For example, one of the common identifying attributes can be DNS 2. This would indicate that this Domain Name Server (DNS 2) is a cause of the problem. As can be seen, knowing that many of those who are suffering are DNS 2 users can be very useful in determining the reason for the problem.

The same or other symptoms can provide context as to who's suffering, allowing the operator or system to decide on the priority of the problem depending on who's affected. For example one of the common identifying attributes can be department information. This information can be used to see which departments are effected and help can be provided in a predetermined order of priority.

For example, if some but not all end-points within the US office have a slow response time because of a DNS server problem, see FIG. 2, it's likely that multiple symptoms will be generated. The correlation process will indicate that the generated symptoms are comprised of end-points having the DNS-2 as a common identifying attribute. This will, help defining the problem comprised of the symptoms as related to DNS 2.

Simple solutions for problem classification are application-based (all symptoms for a given application are grouped together), and time-based (symptoms opened around the same time are grouped together) or a combination of the two. Alternatively, to be able to deal with problems in a way that is focused at resolving them, the system groups symptoms that have common correlation. This is the preferred implementation.

As additional symptoms are grouped together, and as additional end-points and/or components are assigned as suffering end-points within the symptom, the severity of the problem is calculated as a factor of the magnitude of the deviation and/or the number of end-points being affected.

In certain implementations, the severity could include additional information about the suffering end-points, such as their departments One could also use financial metrics assigned to specific attribute values to accumulate the cost of the problem, and provide severity according to that.

When classifying, we search for a group of end-points, defined through a value (or values) of identifying attribute(s) that would have the best correlation metric to the end-points comprising an affected end-points of a problem. The goal of the classification process is to provide indications of commonality for the list of end points where a deviation was detected.

The system is able to generate all group data at all times, but can also optimize the process through prioritizing information collection for attributes deemed relevant over generally collected attributes.

Providing Feedback to the System

If the system detects a problem, the system operator (an IT operator, administrator or help desk representative) can instruct the system through the GUI-based console to either split the relevant MP in to two or more MPs, combine parts of the identifying attribute values of the MP to other MPs or not to do anything. If the symptom indicates a part of a problem nothing is done because the system is operating properly. If the symptom merely indicates, for example, end points at different locations, the MP will be split to accommodate these two or more normal situations. Alternatively, the user could change the sensitivity settings used by the deviation detection to a higher or lower threshold, depending on whether he would like more or less alerts. The system can provide the user with information related to previously stored detection statistics for the user suggested sensitivity setting.

Generation of Reports

Unique performance data collected by the system includes actual application performance from the end user perspective.

Unique problem data collected by the system includes actual affected end-points and their identifying attributes, such as the logged in end-user, problem magnitude and actual duration.

This information can then be used to generate reports about problem magnitude, who are the affected users, what is common to these affected and root-cause of the problem. This information can also be used to generate problem-related reports, including: most serious problems, repeat problems (problems closed by the IT personnel while not really closed), etc.

Additional analysis of problem data in general with reports thereon, and specifically the commonality and root-cause analysis can indicate weak spots in the infrastructure. This is useful information for infrastructure planning. Additional analysis and generation of reports of application performance data and resulting baselines can be used for capacity planning.

While this invention has been described with respect to particular embodiments thereof it should be understood that numerous variations thereof will be obvious to those of ordinary skill in the art in light thereof.

The invention claimed is:

1. A method of adaptively monitoring a computer network, the method comprising:
providing a computer network that includes a plurality of associated network components and a plurality of terminals connected thereto, the pluralities of network components and terminals configured to run a plurality of application programs at least one of which is configured to perform one or more user initiated activities, two or more of the network components and/or terminals being associated with one or more identifying attributes, each identifying attribute being a value that can be determined at a given time for any network component or terminal;
providing one or more activity signatures each usable to detect that a specific activity has been performed;
detecting, using the one or more activity signatures, one or more baselined attributes of one or more user initiated activities of the two or more of the network components and/or terminals, each baselined attribute being defined by its own signature that may extend beyond an associated activity signature;
measuring, after the detecting, one or more of the same baselined attribute values of the two or more network components and/or terminals; and
grouping network components and/or terminals into a plurality of subsets thereof based on the measured attribute values so as to yield group descriptions, each group description describing a group of the network components and/or terminals whose members share related characteristics in the measured baselined attribute values, the yielded group descriptions being monitoring profiles that are usable to detect abnormal behavior of a member or members of the described group.

2. The method of claim 1, wherein, depending on sensitivity settings and types of problems a user wishes to detect, critical values to be used by a detection system for each monitoring profile are generated.

3. The method of claim 1, wherein one or more of the activity signatures is adaptively generated using an adaptive monitoring method.

4. The method of claim 1, wherein the activity signatures are a series of opcodes each indicating that a unique operation of a specific user driven activity has been executed by an application, and wherein each activity signature indicates a start and an end of a specific user driven activity.

5. The method of claim 1, wherein at least one of the activity signatures is defined by a user.

6. The method of claim 1, wherein the grouping is done by using logistic regression.

7. The method of claim 1, wherein the grouping is done by using decision tree logic.

8. The method of claim 1, wherein at least one of the network components and/or terminals is described by two or more group descriptions.

9. A method of adaptively monitoring a computer network the method comprising:
providing a computer network that includes a plurality of associated network components and a plurality of terminals connected thereto, the pluralities of network components and terminals configured to run a plurality of application programs at least one of which is configured to perform one or more user initiated activities, the execution of each activity generating a data stream;
detecting opcodes in one or more data streams resulting from the execution of the one or more activities multiple times, each opcode indicating that a unique operation of a specific user driven activity has been executed by an application;
providing one or more activity signatures each usable to detect that a specific activity has been performed;
detecting, using the one or more activity signatures, one or more baselined attributes of one or more user initiated activities of the two or more of the network components and/or terminals;
measuring, after the detecting, one or more of the same baselined attributes of the two or more network components and/or terminals, each baselined attribute defined by its own signature that may extend beyond an associated activity signature;
grouping network components and/or terminals into a plurality of subsets thereof based on (i) the measured attribute values and (ii) the identifying characteristics so as to yield group descriptions, each group description describing a group of the network components and/or terminals whose members share related characteristics in the measured baselined attribute values, the yielded descriptions being monitoring profiles; and
using the monitoring profiles as identifiable groups of network components and/or terminals to detect abnormal behavior of a member or members of the yielded groups by comparing the measured baselined values against expected baselined values in real time.

10. A system for adaptively monitoring a computer network, the system comprising:
a plurality of associated network components and a plurality of terminals connected thereto, the pluralities of network components and terminals configured to run a plurality of application programs at least one of which is configured to perform one or more user initiated activities, two or more of the network components and/or terminals being associated with one or more identifying attributes, each identifying attribute being a value that can be determined at a given time for any network component or terminal;
a storage section that provides one or more activity signatures each usable to detect that a specific activity has been performed;
a detecting section that detects, using the one or more activity signatures, one or more baselined attributes of one or more user initiated activities of the two or more of the network components and/or terminals, each baselined attribute being defined by its own signature that may extend beyond an associated activity signature;

a measuring section that measures, after the detecting, one or more of the same baselined attribute values of the two or more network components and/or terminals; and a logic section that groups network components and/or terminals into a plurality of subsets thereof based on the measured attribute values so as to yield group descriptions, each group description describing a group of the network components and/or terminals whose members share related characteristics in the measured baselined attribute values, the yielded descriptions being monitoring profiles that are usable to detect abnormal behavior of a member or members of the described group.

11. A system for adaptively monitoring a computer network, the system comprising:

a plurality of associated network components and a plurality of terminals connected thereto, the pluralities of network components and terminals configured to run a plurality of application programs at least one of which is configured to perform one or more user initiated activities, the execution of each activity generating a data stream;

a first detecting section that detects opcodes in one or more data streams resulting from the execution of the one or more activities multiple times, each opcode indicating that a unique operation of a specific user driven activity has been executed by an application;

a storage section that provides one or more activity signatures each usable to detect that a specific activity has been performed;

a second detecting section that detects, using the one or more activity signatures, one or more baselined attributes of one or more user initiated activities of the two or more of the network components and/or terminals;

a measuring section that measures, after the detecting, one or more of the same baselined attributes of the two or more network components and/or terminals, each baselined attribute defined by its own signature that may extend beyond an associated activity signature;

a logic section that groups network components and/or terminals into a plurality of subsets thereof based on (i) the measured attribute values and (ii) the identifying characteristics so as to yield group descriptions, each group description describing a group of the network components and/or terminals whose members share related characteristics in the measured baselined attribute values, the yielded descriptions being monitoring profiles; and a monitoring section that used the monitoring profiles as identifiable groups of network components and/or terminals to detect abnormal behavior of a member or members of the yielded groups by comparing the measured baselined values against expected baselined values in real time.

12. The method of claim 9, wherein the activity signatures are a series of opcodes each indicating that a unique operation of a specific user driven activity has been executed by an application.

* * * * *